United States Patent [19]

Decker et al.

[11] 4,099,854

[45] Jul. 11, 1978

[54] OPTICAL NOTCH FILTER UTILIZING ELECTRIC DIPOLE RESONANCE ABSORPTION

[75] Inventors: Donald L. Decker, Ridgecrest; William M. Tolles, Monterey, both of Calif.

[73] Assignee: The Unites States of America as represented by the Secretary of the Navy, Washington, D.C.

[21] Appl. No.: 731,285

[22] Filed: Oct. 12, 1976

[51] Int. Cl.² ............................................. G02B 5/24
[52] U.S. Cl. ...................... 350/312; 350/1.5; 350/147; 350/267; 350/354
[58] Field of Search ............ 350/147, 149, 154, 160 R, 350/160 LC, 267, 311, 312, 1

[56] References Cited

U.S. PATENT DOCUMENTS

| | | | |
|---|---|---|---|
| 3,458,249 | 7/1969 | George | 350/312 X |
| 3,512,876 | 5/1970 | Marks | 350/267 |
| 3,711,181 | 1/1973 | Adams, Jr. et al. | 350/147 X |
| 3,841,732 | 10/1974 | Marks | 350/160 R |

OTHER PUBLICATIONS

Green et al., "Optical Properties of the Alpha-Phase Alloys AG-ZN and AG-CD," Physical Review B, vol. 2, No. 2, Jul. 1970, pp. 330-340.
Kerker et al., "Electrooptic Properties of Absorbing Spheroids," Applied Optics, vol. 10, No. 12, Dec. 1971, pp. 2670-2674.
Naumenko et al., "Absorption of Light by Suspension of Particles...", Journ. of Appl. Spectro., vol. 20, No. 4, Apr. 1974, pp. 523-527.
Ganiere et al., "On the Size Dependence of the Optical Absorption...", Solid State Commun., vol. 16, No. 1, Jan. 1975, pp. 113-115.
*The American Heritage Dictionary of the English Language*, W. Morris. Ed., Houghton Mifflin Co., Boston, 1976, pp. 262, 806, 807.

*Primary Examiner*—John K. Corbin
*Assistant Examiner*—John D. Lee
*Attorney, Agent, or Firm*—R. S. Sciascia; Roy Miller; K. G. Pritchard

[57] ABSTRACT

An optical notch filter having a suspension of small absorbing particles which blocks a narrow band of frequencies. The small absorbent particles are suspended as a colloidal system which can have either a solid, liquid or gas as host material. The absorbing particles can be incorporated in a solid matrix as a transmission filter or used on the surface of a mirror as a reflection filter. The filter can be tuned by an externally applied electric field or by applying hydrostatic pressure.

22 Claims, No Drawings

OPTICAL NOTCH FILTER UTILIZING ELECTRIC DIPOLE RESONANCE ABSORPTION

BACKGROUND OF THE INVENTION

The present invention relates to optical filters, and more particularly to optical filters using the electric dipole resonance absorption in polarizable particles.

The resonant absorption frequency, $f_o$, or wavelength, $\lambda_o$, of polarizable particles which are small in spatial extent with respect to the wavelength of incident radiation depends upon the complex dielectric constant, $\bar{\epsilon}(\lambda)$, where $\bar{\epsilon}(\lambda) = \epsilon_1(\lambda) + i\epsilon_2(\lambda)$, upon the shape of the particle, and upon the alignment of the particle with respect to the incident radiation field if the particle is not spherical or isotropic. For example, the absorption cross section in vacuum at wavelength $\lambda$ of a small isotropic spherical particle of a radius $a$ is $$C_a = 12\pi a^2 x \frac{\epsilon_2}{(\epsilon_1 + 2)^2 + \epsilon_2^2}. \tag{1}$$

where $x = ka = 2\pi a/\lambda$. The scattering cross section is similarly given by Rayleigh's solution $$C_s = \frac{8}{3}\pi a^2 x^4 \frac{(\epsilon_1 - 1)^2 + \epsilon_2^2}{(\epsilon_1 + 2)^2 + \epsilon_2^2}. \tag{2}$$

The small particle assumption is equivalent to assuming that both X and $X(\bar{\epsilon}^{\frac{1}{2}}) \ll 1$, so that if there is any absorption at all, it will in general dominate any scattering effects as a result of the dependence of $C_a$ and $C_s$ on $x$:

$$\frac{C_a}{C_s} \sim x^{-3} \tag{3}$$

Hence, for a suspension of small absorbing particles only the absorption contribution to the total extinction need be considered.

If $\epsilon_2(\lambda_o) \ll 1$ and $\epsilon_1(\lambda_o) \sim -2$, then from Equation (1) $C_a$ becomes large. This resonant behavior is related to the resonant surface absorption observed on rough metal surfaces in the ultraviolet (surface plasmon absorption) and on rough dielectric surfaces in the infrared (surface polariton absorption). The condition $\epsilon_1 = -2$ will occur in a given material at a given wavelength. In this wavelength region $\epsilon_1$ and $\epsilon_2$ will be strongly wavelength dependent.

For a spheroidal particle of volume V with depolarization factor L, the absorption cross section is $$C_a = kV \frac{\epsilon_2}{[L(\epsilon_1 - 1) + 1]^2 + L^2\epsilon_2^2}. \tag{4}$$

For an oblate spheroid of large aspect ratio (disc shape) with radiation incident perpendicular to the plane of the disc, $$L \approx \frac{\pi a}{4b}$$

where $a$ and $b$ are respectively the minor and major semi-axes of the ellipse. The new resonant condition is $$\epsilon_1(\lambda_o) = 1 - \frac{1}{L}, L\epsilon_2(\lambda_o) \ll 1.$$

If the particles are imbedded in a medium with dielectric constant $\epsilon_o$, the absorption cross section is recomputed using the relative dielectric constant $\epsilon/\epsilon_o$ and the wavelength in the medium $\lambda/\epsilon_o^{\frac{1}{2}}$. For a spherical particle $$C_a = 12\pi a^2 x \epsilon_o^{3/2} \frac{\epsilon_2}{(\epsilon_1 + 2\epsilon_o)^2 + \epsilon_2^2} \tag{5}$$

The resonant condition is now $\epsilon_1(\lambda_o) = -2\epsilon_o, \epsilon_2(\lambda) \ll \epsilon_o$.

If the scattered radiation fields at a particle from all other particles is negligible, then the particles behave independently. In this case, if the suspension consists of N identical spherical particles per unit volume, then the absorption coefficient $\alpha$ (Lambert's law) = $NC_a$, or $$\alpha = \frac{18\pi}{\lambda}\left(\frac{m}{\rho}\right)\epsilon_o^{3/2}\frac{\epsilon_2}{(\epsilon_1 + 2\epsilon_o)^2 + \epsilon_2^2}, \tag{6}$$

where $m$ is the mass of suspended material per unit volume of space, and $\rho$ is the bulk density of the suspension material. Thus, the absorption coefficient is independent of particle size within the assumption $x \ll 1$, $X(\bar{\epsilon}^{\frac{1}{2}}) \ll 1$.

DESCRIPTION OF THE PREFERRED EMBODIMENTS

An optional notch filter is constructed by suspending resonant absorptive particles, which are small with respect to the wavelength of incident radiation, in a host material to form a colloidal system. The host material can be a solid, liquid or gas. For a given notch frequency a particle material for which $\epsilon_1 = -2\epsilon_o$ is chosen per Equation (1). The filter can take any desired physical form, i.e., a plane parallel slab or a spherical shell, for example.

One method for producing a transmission filter incorporating the absorbing particles in a solid matrix is as follows:

(a) Mull the absorbing particles together with finely ground powder of the suspending matrix material, but not to the extent of changing the shape or character of the absorbing particles; and (b) Place the powder between the dies of a "pill press", evacuate the air, and press.

Typical pressures required are 100,000 lb/in² or less. Heating the powder mixture to 150°–350° C in the dies will greatly aid in producing a high density (no voids) component when using suspending matrix materials of high yield point such as $CaF_2$ or $LiF$.

Other filter configurations are possible. If the absorbing particles are allowed to settle on the surface of a substrate, the particles behave substantially as if they were in air. If the substrate is transparent, a transmission filter results, but if the substrate is a mirror, a reflection filter results where absorption occurs by the radiation in passing to and from the mirror. Or the absorbing particles could be suspended in a mixture of miscible lyophilic liquids in a cell.

Table 1 lists possible absorbing particles and suspending materials. This list is representative of the types of materials which can be used.

Table 1

| Particle | Suspending Material | Absorption Peak (Spherical Particles) | Peak Width (Half Maximum) |
|---|---|---|---|
| MgO | air | 16.5 μm | 0.7 μm |
|  | KBr | 18.1 μm |  |
| BeO | air | 10.4 μm (double peak) | 0.4 μm |
|  | NaF | 10.8 μm |  |
| αAl$_2$O$_3$ | air | 12.9 μm (double peak) | 0.5 μm |
|  | KBr | 14.0 μm |  |
| BN | air | 7.9 μm | 0.3 μm |
|  | KBr | 8.3 μm |  |
| Ag$_{1-x}$Cd$_x$ alloy system | air | .28 – .35 μm |  |
|  | CaF$_2$ | .32 – .39 μm |  |
| Ag | air | .35 μm | 0.01 μm |
|  | CaF$_2$ | .39 μm |  |

Other possible matrix materials for use in the infrared include KCl, NaCl, KRS-5 (a well known optical material which is an intimate thallium bromide-iodide mix) and ZnSe. For use in the near infrared into the near ultraviolet the nonhygroscopic materials, CaF$_2$, BaF$_2$ and LiF, are available. The difference in wavelength of the absorption peaks for air and KBr or CaF$_2$ indicated is due to the effect described by Equation (5), i.e., the notch center frequency can be varied by changing $\epsilon_o$. This can be accomplished by changing materials or by changes in composition of a mixture of compatible materials.

The notch frequency can also be varied by changing the optical properties of a given material by changes in composition. For example, silver can be alloyed with Zn or Cd to at least 30% atomic concentration with a corresponding shift in the resonant wavelength, as indicated in Table I, from 3500 Å (pure silver) to 2800 Å (30% alloy). Any notch frequency in this range can be obtained by producing an alloy with the proper composition.

The filter can also be "tuned" by changing the shape of the absorbing particle. As indicated by Equation (4), the filter notch frequency is independent not only upon the particle material parameter, $\tilde{\epsilon}$, but also upon a geometrical factor, L. The absorption cross section is now anisotropic, since L changes depending upon the angular relationship between the electric field vector of the incident radiation and the axes of the particle. This geometrical "tuning" is significant, but is achieved at the expense of losing the angle of incidence insensitivity present with spherical absorbing particles.

Finally, it is possible to tune the filter continuously and reversibly by varying $\epsilon_o$ with an external applied electric field, or by applying hydrostatic pressure.

The optical notch filter can be used in the infrared as a high Q notch filter against unwanted narrow band radiation, i.e., BeO in NaF would be effective against 10.6 μm CO$_2$ laser radiation. In the ultraviolet a notch filter, consisting of particles of Ag$_{1-x}$Cd$_x$ or Ag$_{1-x}$Zn$_x$ in CaF$_2$ for example, can be used as an absorption filter for solar blind applications to provide the very sharp absorption edge required. A filter having a range of particle composition results in smearing out of the absorption peak, i.e., broadening the wavelength range of response.

Thus, the present invention provides a high Q notch absorption filter at a center frequency, $f_o$, which can be in principle any frequency desired from ultraviolet through microwave, typically with values of Q on the order of 20. The filter can be angle of incidence insensitive (spherical particles of unoriented nonspherical particles). For unoriented nonspherical particles the filter response is the superposition of absorption cross sections of all possible orientation which extends the response over a broader wavelength range (smeared out) than for a given orientation. Additionally, the filter area can be very large with virtually any shape, and the notch frequency can be adjusted by varying material parameters, and can be fine tuned after construction by applying an external electric field or by hydrostatic pressure.

What is claimed is:

1. An optical notch filter comprising:
   a suspending material wherein said suspending material comprises a material selected from the group consisting of air, KBr, NaF, CaF$_2$, BaF$_2$, LiF, KCl, NaCl, KRS-5 and ZnSe; and
   a plurality of absorbing particles within said suspending material to form a colloidal system, said particles having a dielectric constant such that a resonant absorption condition exists for a given wavelength of incident radiation, and being small in size relative to said wavelength.

2. An optical notch filter as recited in claim 1 further comprising a means for reflecting said incident radiation situated such that said colloidal system is between said reflecting means and said incident radiation.

3. An optical notch filter comprising:
   a suspending material; and
   a plurality of absorbing particles within said suspending material to form a colloidal system, said particles having a dielectric constant such that a resonant absorption condition exists for a given wavelength of incident radiation, and being small in size relative to said wavelength.
   wherein said absorbing particles comprise a material selected from the group consisting of MgO, BeO, αAl$_2$O$_3$, BN, Ag$_{1-x}$Cd$_x$ alloy system, Ag$_{1-x}$Zn$_x$ alloy system and Ag.

4. An optical notch filter as recited in claim 3 wherein said Ag$_{1-x}$Cd$_x$ and Ag$_{1-x}$Zn$_x$ alloy systems comprise Ag alloyed with Cd and Zn, respectively, to at least 30% atomic concentration.

5. An optical notch filter as recited in claim 3 further comprising a means for reflecting said incident radiation, situated such that said colloidal system is between said reflecting means and said incident radiation.

6. An optical notch filter as recited in claim 3 wherein said suspending material comprises a material transparent to said incident radiation.

7. An optical notch filter as recited in claim 3 wherein said suspending material comprises a solid.

8. An optical notch filter as recited in claim 3 wherein said suspending material comprises a fluid.

9. An optical notch filter as recited in claim 8 wherein said fluid is a gas.

10. An optical notch filter as recited in claim 8 wherein said fluid is a liquid.

11. An optical notch filter as recited in claim 10 wherein said liquid is a miscible lyophilic liquid.

12. An optical notch filter comprising
   a suspending material;
   a plurality of absoring particles within said suspending material to form a colloidal system, said particles having a dielectric constant such that a resonant absorption condition exists for a given wavelength of incident radiation, and being small in size relative to said wavelength; and means for tuning said filter.

13. An optical notch filter as recited in claim 12 wherein said tuning means comprises a means for applying an external electric field to said filter to vary said dielectric constant.

14. An optical notch filter as recited in claim 13 wherein said absorbing particles are non-spherical in shape so that the resonant absorption condition is dependent upon the geometric shape and orientation of said particles.

15. An optical notch filter as recited in claim 13 wherein said tuning means comprises a means for applying hydrostatic pressure to said filter.

16. An optical notch filter as set forth in claim 12 wherein said filter's absorption wavelength is shifted by predetermined changes in the composition of said suspending material.

17. An optical notch filter as set forth in claim 12 wherein said filter's absorption wavelength is shifted by predetermined changes in the composition of said absorbing particles.

18. A method for producing an optical notch filter comprising the steps of:

mulling a plurality of absorbing particles having a dielectric constant such that a resonant absorption condition exists for a given wavelength of incident radiation, and being small in size relative to said wavelength, together with a finely ground powder of a suspending material without changing the character of said absorbing particles; and pressing said mulled powder mixture in a vacuum to form a solid matrix.

19. A method for producing an optical notch filter as recited in claim 18 further comprising the step of heating said mulled powder mixture to a temperature of about 150° to 350° C while pressing said powder mixture.

20. A method for producing an optical notch filter as recited in claim 19 wherein the step of pressing comprises pressing with a pressure of 100,000 lb/in$^2$ or less.

21. An optical notch filter comprising;

a suspending material selected from the group consisting of air, KBr, NaF, CaF$_2$, BaF$_2$, LiF, KCl, NaCl, KRS-5 and ZnSe; and a plurality of absorbing particles within said suspending material to form a colloidal system said particles having a dielectric constant such that a resonant absorption condition exists for a given wavelength of incident radiation, and being small in size relative to said wavelength, wherein said absorbing particles are selected from the group consisting of MgO, BeO, $\alpha Al_2O_3$, BN, $Ag_{1-x}Cd_x$ alloy system, $Ag_{1-x}Zn_x$ alloy system and Ag.

22. An optical notch filter as recited in claim 21 further comprising a means for reflecting said incident radiation such that said colloidal system is between said reflecting means and said incident radiation.

* * * * *